July 14, 1925.
B. GLUER
1,546,123
ELECTRIC SIGNALING SYSTEM FOR THE TELECONTROL OF GUNS OR THE LIKE
Filed May 13, 1922
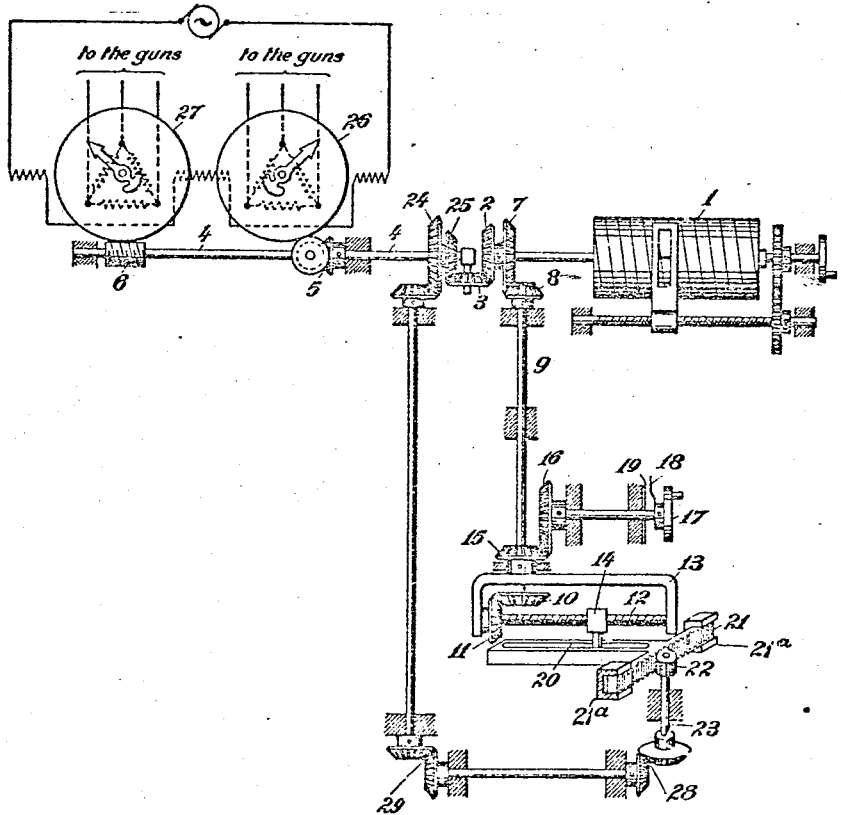
Inventor
Bruno Glüer
by Knight Bro.
attorney Patented July 14, 1925.

1,546,123

UNITED STATES PATENT OFFICE.

BRUNO GLÜER, OF BERLIN, GERMANY, ASSIGNOR TO SIEMENS & HALSKE AKTIEN-GESELLSCHAFT, OF SIEMENSSTADT, NEAR BERLIN, GERMANY, A GERMAN CORPORATION.

ELECTRIC SIGNALING SYSTEM FOR THE TELECONTROL OF GUNS OR THE LIKE.

Application filed May 13, 1922. Serial No. 560,860.

*To all whom it may concern:*

Be it known that I, BRUNO GLÜER, a citizen of the German Empire, residing at Berlin, Germany, have invented certain new and useful Improvements in an Electric Signaling System for the Telecontrol of Guns or the like, of which the following is a specification.

Owing to the long time of flight of the projectile of far-reaching guns of latest type, the so-called "distance of the target" determined by the range finders must be corrected in the "ballistic range" wanted by the artillerist. For this purpose, certain corrections: for instance, for the air weight existing when firing, for abnormal powder temperature, for wind, or for the decrease and increase of the range during the time of flight, are calculated or taken from schedules and applied to the "distance of the target". As known, said corrections depend upon the time of flight of the projectile.

The present invention has for its object to provide simple adjusting means for mechanically and automatically representing the corrections aimed at.

As the scale, that transmits to the guns the angle of inclination, e. g. angular values, is gauged for distance, e. g. longitudinal values, the distance of the gauge marks from each other must correspond to the mean horizontal velocity of the projectile, which is equal to the quotient of the linear distance of the target divided by the time of flight.

As the distance scale, which is to transmit to the guns or the like the angle of inclination, contains thus the time of flight, this can be attained by mechanically coupling to the transmission gear, intermediate said scale and the transmitters of a fire control apparatus at a central station for transmitting the adjustment of said scale to said transmitters, a multiplication gear, which automatically multiplies the time of flight existing in said scale by any other ballistic correction, for instance the "increase and decrease of the range per time unit", adjusted on a separate scale and adds said multiplication product, through a planet-wheel, for instance, to the transmission gear leading to the transmitters.

This arrangement has the further essential advantage that the ballistic range wanted by the artillerist can at any time be read off and that the value of the correction varies continuously, which was not possible with the hitherto known arrangements.

The accompanying drawing shows a diagrammatic elevation of the improved arrangement, in a preferred form of construction.

By the adjustment of the distance of the target on a revoluble scale 1 mounted in a casing (not shown) of the apparatus, at the same time a bevel wheel 2, a planet-wheel 3, and a shaft 4, are turned. The latter moves, through a pinion 5 and a worm 6, the transmitters 26 and 27. The latter are also mounted in the casing of the apparatus and connected in a way known in the art to electric receivers on the guns. The movement of the revoluble scale 1 is further transmitted through a second bevel wheel 7 on its axle, a bevel wheel 8, and a bevel gearing 10, 11, to a screw-spindle 12. The latter is supported in a yoke 13 and carries a sliding block 14 which is threaded thereon. When the distance scale 1 is adjusted to the value 0, said sliding block lies in line with the axis of shaft 9. The yoke 13 carrying the spindle 12 can be swung around through a bevel gearing 15, 16 operated from a hand wheel 17. The latter turns a pointer 18 on a scale 19 gauged for the increase and decrease of the range per time unit. The sliding block 14 is thus swung around, by turning said hand wheel 17, corresponding to the increase or decrease of the range per time unit. By the revolution of the distance scale 1, which contains the time of flight, the sliding block 14 is radially displaced corresponding to the time of flight of the projectile.

The sliding block 14 is in engagement with a T-shaped slotted race 20, located parallel to the zero angular position of the yoke 13. This slotted race carries a rack 21 extending at right angles to the race and being slidingly disposed in guide blocks 21ª so that the race can move at right angles to its own slot. Said rack is in gear with a pinion 22, which, through its shaft 23 and bevel gearings 28, 29, turns the double bevel wheel 24, 25 loosely mounted on the shaft 4.

The bevel wheel 25 is in gear with the planet-wheel 3, to which it transmits its movement as an addition, which is thus communicated to the transmitters 26 and 27 through bevel wheel 5 and worm 6.

The idea of the invention is not limited to one single scale 19 gauged for the "increase and decrease of the range per minute," as also the remaining corrections can be separately or commonly transmitted to the bevel wheel 16 in a way known in the art, for instance through planet-gearings.

What I claim, is:

1. In an electric signaling system for the telecontrol of guns, in combination an electric transmitter at a central station adapted to actuate an electric receiver on the guns connected to said transmitter, a range scale containing the time of flight factor, an epicyclic (planet) gear interposed between said transmitter and said range scale, a separate scale for the rate of change of range, and a multiplication system comprising one member mechanically moved by said range scale, a second member mechanically moved by said separate rate of change of range scale, and a third member of said system, moved corresponding to the product of the adjustment given by said scales and operating upon said epicyclic gear, so that the movement of said third member is added to the first range adjustment of said transmitter.

2. In an electric signaling system for the telecontrol of guns in combination a plurality of transmitters for coarse and fine adjustment adapted to actuate a plurality of coarse and fine receivers on the guns connected to said transmitters, a range scale containing the time of flight factor, an epicyclic gear interposed between said transmitters and said range scale, a separate scale for the rate of change of range and a multiplication gear, comprising a yoke mechanically moved by the adjustment of said separate scale, a screw-threaded spindle rotatably mounted in said yoke and adapted to be rotated by the adjustment of said range scale, a sliding block threaded on said spindle and adjustable by said spindle rotation, and a sliding rack bar having a slot engaging said block, said bar adapted to be moved corresponding to the product of the amounts of movements of said yoke and of said block and operating upon said epicyclic gear so that the movement of said rack bar is added to the first range adjustment of said transmitters.

In testimony whereof I affix my signature.

BRUNO GLÜER.